Patented Dec. 16, 1930

1,785,472

UNITED STATES PATENT OFFICE

HOWARD ADLER AND GUY A. McDONALD, OF CHICAGO HEIGHTS, ILLINOIS, ASSIGNORS TO VICTOR CHEMICAL WORKS, OF CHICAGO, ILLINOIS, A CORPORATION OF ILLINOIS

SEED FUNGICIDE AND DISINFECTANT

No Drawing.   Application filed December 10, 1927.   Serial No. 239,262.

The present invention relates to fungicide materials, particularly intended for use in the treatment of seeds of various cereals to disinfect them and prevent the development of fungous diseases. It has to do particularly with such fungicides containing insoluble copper compounds and having unusually high efficiency in combating fungous and smut diseases.

Attempts have hitherto been made to produce such fungicides by the formation of copper carbonates or basic carbonates associated with additional inert material, such as calcium sulfate; and while such compounds have certain advantages in producing a fairly uniform dilution of the insoluble copper carbonate and aiding in its dispersion over the surfaces of the seeds being treated, experimental work conducted in various sections of the country and particularly at the experiment stations of Washington, California and Minnesota indicates that such compounds as hitherto produced are erratic in their action and in general have no higher efficiency than that of an amount of undiluted copper compound equivalent to the proportion of copper compound present in the mixture.

In accordance with the present invention, we have produced an effective copper bearing fungicide for use in disinfecting seeds in which the effective copper compound is incorporated with and distributed over the surface of an inert material. The total proportion of copper compound present being 40 to 50% of the entire mass of the material, and the fungicidal efficiency of the copper compound being so greatly increased that a given weight of the compound of our invention has a fungicidal action at least as great as an equivalent weight of copper carbonate or similar copper fungicide, undiluted. The compound of the present invention has the further advantage of low apparent density, and this fact together with the extensive distribution of the copper bearing material over the surface of the inert material greatly facilitates its dissemination among the seed particles.

In preparing the fungicide in accordance with the present invention, calcium oxalate is subjected in finely dispersed form to the action of a solution of a soluble copper salt, preferably the sulfate. For example, the calcium oxalate may be suspended in water and the solution of copper sulfate slowly added thereto with constant agitation, or the finely powdered calcium oxalate may be admixed directly with the copper sulfate solution. The proportions are preferably selected so as to give a compound containing 40 to 50% of copper oxalate, although the proportion may be varied to a considerable extent. To illustrate the invention more fully, the following specific example of the manufacture of a compound embodying the present invention is given:

Sixteen hundred parts by weight of commercial calcium oxalate smaller than forty mesh are suspended in eighteen thousand parts of water and heated to 50 to 75° C. Twenty-five hundred parts of copper sulfate are dissolved in nineteen thousand parts of water and the solution slowly added to the suspension of the calcium oxalate, the rate of addition being such that about 45 minutes are required to run in the total amount of copper sulfate. During the addition of the copper sulfate solution the mixture is vigorously stirred and this stirring is continued for some time, suitably one hour, after all of the copper sulfate solution has been added. The material is filtered, and the precipitate filtered out is dried. The dried precipitate is found to contain about 50% of copper oxalate and to have an apparent density of 35 lbs. per cubic foot. Copper oxalate itself has an apparent density of about 97 lbs. per cubic foot. It is thus apparent that the compound formed in accordance with the present invention may be much more readily distributed over the seed or other materials or plants to be subjected to treatment than the copper oxalate. Furthermore, fungicidal tests have shown that the efficiency of the compound prepared in accordance with our invention is at least equal, weight for weight, to that of undiluted copper carbonate or equivalent copper fungicide material.

It is readily apparent that instead of calcium oxalate, barium oxalate or other similar insoluble oxalate of a metal forming insoluble sulfates may be employed, and that other soluble copper salts than the copper sulfate can be employed in carrying out the above reaction, the acid radical of such salts being of a character to form water insoluble salts with the metal of the oxalate used. Furthermore, although in the specific example given details of proportions employed are set forth, it is to be understood that these details are not to be regarded as limitations upon the scope of the invention except in so far as included in the accompanying claims.

We claim:

1. The method of producing a disinfectant suitable for use in the treatment of seeds of cereal plants which comprises suspending calcium oxalate in water, heating the suspension and slowly adding thereto a solution of copper sulfate thereby simultaneously forming and precipitating copper oxalate and calcium sulfate, separating the resulting precipitate, and drying the latter.

2. A fungicide and seed disinfectant comprising particles of simultaneously formed copper oxalate and calcium sulfate.

3. A fungicide and seed disinfectant comprising a finely powdered material, the particles of which consist of copper oxalate and calcium sulfate, said material having an apparent density of less than 40 lbs. per cubic foot.

4. As a composition of matter, seed having intimately and superficially applied thereto copper oxalate extended upon particles of calcium sulfate.

HOWARD ADLER.
GUY A. McDONALD.